: 3,595,847
Patented July 27, 1971

---

3,595,847
PROCESS FOR THE PRODUCTION OF SULPHUR-MODIFIED POLYCHLOROPRENES
Rudolf Mayer-Mader, Cologne-Buchheim, Willi Wolff, Schildgen, and Edmund Hüther, Opladen, Germany, assignors to Farbenfabriken Bayer Aktiengesellschaft, Leverkusen, Germany
No Drawing. Filed Dec. 30, 1968, Ser. No. 788,052
Claims priority, application Germany, Jan. 8, 1968, P 17 20 111.5
Int. Cl. C08d 1/09, 5/00; C08f 27/06
U.S. Cl. 260—92.3                                1 Claim

ABSTRACT OF THE DISCLOSURE

Process for producing sulphur-modified chloroprene polymers having a predetermined Mooney viscosity by polymerising chloroprene and up to 20% by weight of a comonomer in aqueous emulsion with a peptising agent, where coagulation of the latex is effected immediately after addition of the peptising agent and that the polymer is dried until a Mooney viscosity of 30 to 10 Mooney units above the potential minimum is obtained.

---

It is known that 2-chloro-1,3-butadiene (chloroprene) can be polymerised in aqueous emulsion in the presence of emulsifiers and activators and in the presence of sulphur (cf. U.S. patent specification No. 2,264,173). The resulting polymers are usually insoluble in benzene, particularly when polymerisation is continued up to a monomer conversion of more than 85%.

To obtain chloroprene polymers that are soluble in benzene, the sulphur-containing chloroprene homopolymers and copolymers have to be chemically degraded. This chemical degradation, known as peptisation, is effected by peptising agents, for example tetraethyl thiuram disulphide. Peptisation is carried out on the chloroprene polymer latex and the peptised polymer is subsequently obtained in solid form by coagulating the latex (cf. U.S. patent specification No. 2,234,215 and British patent specification No. 529,838). The degree of peptisation may be determined by measuring the Mooney viscosity of the isolated solid polymer. The degree of peptisation is governed to a large extent by the reaction conditions under which peptisation is carried out. In other words, to obtain a product that has been peptised to a predetermined extent and hence has a certain Mooney viscosity, the conditions under which peptisation is carried out have to be kept constant. In particular, the pH-value, the temperature and the quantity of peptising agent must all be strictly observed. In addition, the degree of peptisation, and hence the Mooney viscosity, are governed by the amount of sulphur present. Unfortunately, none of these parameters is easy to maintain. Apart from this, considerable reaction times are necessary between the polymerisation stage and coagulation of the polymer latex. In all conventional processes for the production of sulphur-modified polychloroprenes, this peptisation in the latex phase is necessary in order to adjust a desired Mooney viscosity in the polymer. In addition to constant reaction conditions, another factor of importance in peptisation is that the reaction should be terminated after the required viscosity has been reached.

For example, it is necessary precisely to determine the moment when peptisation ends, and to prevent further peptisation by the addition of substances such as potassium hexacyanoferrate (cf. French patent specification No. 1,381,913) or by cooling the latex to temperatures below 20° C. (cf. British patent specification No. 995,690) or by the addition of persulphate (cf. British patent specification No. 977,844).

To prevent the latex from becoming unstable after acidification, additives such as sodium bisulphite are required (cf. French patent specification No. 1,392,446 and German Auslegeschrift No. 1,223,147).

The object of this invention is to simplify the peptisation of sulphur-containing chloroprene polymers and, in particular, to prevent peptisation in the latex phase. The invention is based on the following observation:

If a chloroprene polymer latex is coagulated immediately after the peptising agent has been added and the polymer separated, its Mooney viscosity will initially fall on drying, pass through a minimum and then rise again. Accordingly, it is possible by controlling the drying time and the drying temperature to provide the polymer with a predetermined Mooney viscosity without any need for peptisation in the latex phase.

Accordingly, this invention relates to a process for the production of sulphur-modified chloroprene homo- and copolymers having a predetermined Mooney viscosity by polymerising chloroprene and up to 20% by weight, based on chloroprene, of an ethylenically unsaturated comonomer in aqueous emulsion in the presence of from 0.1 to 2% by weight, based on monomer, of sulphur and optionally in the presence of regulators, adding from 0.5 to 5% by weight, based on polymer, of a peptising agent, coagulating the resulting latex and separating the polymer, followed by drying, in which process coagulation is carried out directly after the peptising agent has been added, whilst drying is continued at a temperature of from 80 to 170° C. until a Mooney viscosity of from 30 to 10 Mooney viscosity units above the potential minimum is reached.

For drying, the polymer may be passed through a drying chamber in the form of a polymer band or ribbon. The residence time in the drying chamber is adjusted in such a way that the Mooney viscosity of the dried polymer is some 10 to 30 units in front of the minimum that can be reached during drying. Only under these conditions is it possible to obtain polymers with Mooney viscosities in a commercially interesting range of from about 30 to 80 which do not change, even with prolonged storage.

The polymers prepared by the process according to the invention as described above have some outstanding properties. They are readily masticated on rollers and do not need any additional vulcanisation accelerators.

The polymerisation process for producing the sulphur-modified polychloroprenes is known per se. Any conventional emulsifier may be used, including for example water-soluble salts, in particular alkali metal salts of long-chain fatty acids, resin acids, disproportionated abietic acid, aryl sulphonic acids, and their formaldehyde condensation products, alkyl- and aryl sulphonates and sulphated oxethylated alcohols and phenols.

Suitable polymerisation activators include the conventional catalysts forming free radicals, for example hydrogen peroxide, cumene hydroperoxide, water-soluble salts of peroxy-disulphuric acid, 2,2'-azobisisobutyronitrile, salts of formamidine sulphonic acid and combinations of potassium sulphate and β-anthraquinone sulphonic acid. The last of these materials is also known as silver salts.

In general, an aqueous solution of the catalyst is added to an aqueous emulsion containing monomers and the emulsifier. Polymerisation is normally carried out in a pH-range of from 7 to 13 and at a temperature of from 0 to 60° C., and the emulsion is adjusted in such a way that its total monomer content comprises from 30 to 60% by weight of the weight of the emulsion as a whole.

To adjust a desired molecular weight, polymerisation may be carried out in the presence of regulators such as dialkylxanthogene disulphides or mercaptans.

The following are examples of ethylenically unsaturated comonomers which can be copolymerised with chloroprene: acrylonitrile, methacrylonitrile, ethyl acrylate, 2,3-dichlorobutadiene and α-chloroacrylonitrile.

After the desired monomer conversion has been reached, polymerisation can be terminated by stoppers or stabilisers or by removing unreacted monomer by steam distillation (cf. U.S. patent specification No. 2,467,769). Suitable stoppers include phenothiazine, p-tert.-butyl pyrocatechol and sodium dialkyl dithiocarbamate, whilst sterically hindered phenols or aromatic amines may be used as stabilisers.

Before the sulphur-modified polychloroprene latex is worked up, the pH-value of the latex is adjusted to a value below 11 by the addition of dilute acetic acid, followed by the addition of a peptising agent to the latex. Tetraalkyl thiuram disulphides are generally used as the peptising agents, being stirred into the latex in the form of aqueous emulsions. The latex is then worked up by low-temperature coagulation. The polymer ribbon is not only dried in the drying cabinet, its viscosity is also reduced by chemical degradation. However, if the heat treatment applied during the drying phase is excessive, the drying and degradation phase may be followed by a cyclisation phase so that the Mooney viscosity increases again. For this reason, it is important to adjust the residence time of the polymer in the drying cabinet in such a way that the polymer is dried and chemically degraded but not cyclised, which would lead to an increase in the Mooney viscosity.

EXAMPLE 1

(Comparison example)

To prepare the sulphur-modified polychloroprenes, an emulsion is prepared in accordance with the following formula:

|  | Parts by wt. |
|---|---|
| Chloroprene | 100.0 |
| Sulphur | 0.6 |
| Desalted water | 120 |
| Sodium salt of disproportionated abietic acid | 4.5 |
| Sodium salt of a condensation product of naphthalene sulphonic acid and formaldehyde | 0.7 |
| Caustic soda | 0.3 |
| Tetrasodium pyrophosphate | 0.5 |

The sulphur is dissolved in the chloroprene and the resulting solution is stirred into the aqueous phase. The temperature is then increased to 49° C., followed by the addition at 60 minute intervals of an activator solution with the following constituents:

|  | Parts by wt. |
|---|---|
| Potassium persulphate | 0.04 |
| β-Anthraquinone sulphonic acid | 0.004 |
| Desalted water | 1.3 |

After the monomer conversion has reached about 85%, a stopper solution of the following composition is added to the latex:

|  | Parts by wt. |
|---|---|
| Dimethylammonium dimethyl dithiocarbamate | 0.1 |
| Desalted water | 1.0 |

The latex is adjusted to a pH-value of approximately 11 and 2 parts by weight of tetraethyl thiuram disulphide are added to it. The tetraethyl thiuram disulphide was dissolved in benzene and then dispersed in water with emulsifiers. The latex is heated to approximately 40–45° C. and stirred. Once it has been determined through sampling that the Mooney viscosity is from 45 to 55, the temperature must be spontaneously lowered to below 20° C. so that no further peptisation can take place. The residual monomer and the solvent are removed from the latex by treatment with steam at reduced pressures, after which the latex has to be cooled again to below 20° C. The latex is then adjusted to pH 7 by the addition of acetic acid and worked up by low-temperature coagulation.

EXAMPLE 2

An emulsion is prepared in accordance with the following formulation (the figures represent parts by weight):

| | |
|---|---|
| Choloroprene | 100 |
| Sulphur | 0.6 |
| p-Tert.-butyl pyrocatechol | 0.01 |
| Sodium salt of the condensation product of β-naphthalene sulphonic acid and formaldehyde | 0.7 |
| Sodium salt of disproportionated abietic acid | 4.5 |
| Caustic soda | 0.3 |
| Tetrasodium pyrophosphate | 0.5 |

The sulphur is dissolved in the chloroprene and the resulting solution is stirred into the aqueous phase. The temperature is then increased to 49° C. followed by the addition, at 60-minute intervals, of an activator solution of the following composition: potassium persulphate, β-anthraquinone sulphonic acid, desalted water.

At a monomer conversion of about 65%, corresponding to a solids content of 29 g., a stopper solution of the following composition is added to the latex:

| | |
|---|---|
| Chloroprene | 0.5 |
| Phenthiazine | 0.0065 |

Unreacted monomers are then removed from the latex by treatment with steam, after which the latex is adjusted to a pH-value of 11.0 with 20% by weight acetic acid. 1 part by weight of a stabiliser and 2 parts by weight of tetraethyl thiuram disulphide dissolved in benzene and emulsified in water, are then added. The polymer is separated from the latex thus treated in the form of a thin ribbon by low-temperature coagulation. This ribbon is passed through a drying cabinet in the usual way, the Mooney viscosity being adjusted in dependence upon the residence time in the cabinet at a constant drying cabinet and cooling roller temperature.

EXAMPLE 3

The starting materials are as in Example 2, and polymerisation is carried out at a temperature of 40° C.

EXAMPLE 4

The emulsion contains the following constituents:

|  | Parts by wt. |
|---|---|
| Chloroprene | 90.0 |
| Acrylonitrile | 10 |
| Sulphur | 0.2 |
| Diisopropyl xanthogene disulphide | 0.2 |
| Desalted water | 120 |
| Sodium salt of disproportionated abietic acid | 4.5 |
| Sodium salt of the condensation product of naphthalene-β-sulphonic acid and formaldehyde | 0.5 |
| Caustic soda | 0.3 |
| Tetrasodium pyrophosphate | 0.5 |

After polymerisation in accordance with Example 2, 5% by weight of tetraethyl thiuram disulphide is added to the latex, which is then worked up in the usual way.

EXAMPLE 5

The emulsion used for polymerisation contains the following constituents:

|  | Parts by wt. |
|---|---|
| Chloroprene | 90.0 |
| Methacrylonitrile | 10 |
| Sulphur | 0.6 |
| Desalted water | 120 |
| Sodium salt of disproportionated abietic acid | 6.5 |
| Sodium salt of the condensation product of naphthalene-β-sulphonic acid and formaldehyde | 0.7 |
| Caustic soda | 0.3 |
| Tetrasodium pyrophosphate | 0.5 |

Polymerisation and working up are as in Example 2.

EXAMPLE 6

The emulsion used for polymerisation contained the following constituents:

| | Parts by wt. |
|---|---|
| Chloroprene | 94.0 |
| 2,3-dichlorobutadiene | 6 |
| Sulphur | 0.6 |
| Desalted water | 120 |
| Sodium salt of disproportionated abietic acid | 4.5 |
| Sodium salt of the condensation product of naphthalene-β-sulphonic acid and formaldehyde | 0.5 |
| Caustic soda | 0.3 |
| Tetrasodium pyrophosphate | 0.5 |

Polymerisation and working up are as in Example 2.

EXAMPLE 7

An emulsion was prepared in accordance with the following formula (the figures represent parts by weight):

| | |
|---|---|
| Chloroprene | 100.0 |
| Sulphur | 0.6 |
| Phenyl-β-naphthylamine | 1 |
| Desalted water | 120.0 |
| Sodium salt of disproportionated abietic acid | 6.5 |
| Sodium salt of the condensation product of β-naphthalene sulphonic acid and formaldehyde | 0.5 |
| Caustic soda | 0.75 |
| Tetrasodium pyrophosphate | 0.5 |

Polymerisation and working up are as in Example 2.

EXAMPLE 8

An emulsion is prepared in accordance with the following formula (the figures represent parts by weight):

| | |
|---|---|
| Chloroprene | 100 |
| Sulphur | 1.5 |
| p-Tert.-butyl pyrocatechol | 0.01 |
| Desalted water | 160 |
| Sodium salt of disproportionated abietic acid | 4.5 |
| Sodium salt of a condensation product of β-naphthalene sulphonic acid and formaldehyde | 0.7 |
| Caustic soda | 0.6 |
| Tetrasodium pyrophosphate | 0.5 |

Polymerisation is carried out as in Example 2, except that it is only stopped after 85% of the monomer has been converted into the polymer.

EXAMPLE 9

An emulsion is prepared in accordance with the following formula (the figures represent parts by weight):

| | |
|---|---|
| Chloroprene | 100 |
| Sulphur | 1.5 |
| p-Tert.-butyl pyrocatechol | 0.01 |
| Desalted water | 120 |
| Sodium salt of disproportionated abietic acid | 4.5 |
| Sodium salt of the condensation product of β-naphthalene sulphonic acid and formaldehyde | 0.7 |
| Caustic soda | 0.7 |
| Tetrasodium pyrophosphate | 0.5 |

Polymerisation is carried out as in Example 2. After polymerisation has been stopped at a monomer conversion of 65%, 1% by weight of thiuram is added and the product worked up in the usual way.

The sulphur-containing chloroprene homo- and copolymers prepared in accordance with Examples 1 to 9 were tested as following, to assess their properties.

The Mooney viscosity of the crude polymer (cf. ASTM D927-49T) is measured after the polymer has been prepared by low-temperature coagulation and drying in a drying cabinet. The polymer is then stored at 70° C. Samples are taken at intervals of 1, 2 and 3 days and the Mooney viscosity is remeasured.

The Mooney value is expressed as the viscosity at 100° C. after the rotor has been running for 4 minutes. The measurement described above is referred to in the following as the Mooney stability of the crude polymer.

It is apparent from Examples 2 to 9 of Table I that the Mooney viscosity decrease with increasing residence time (during drying) passes through a minimum and increases again with fairly long residence times. It is also apparent from Table I that only those polymers which were worked up after a residence time that is not long enough for the lowest Mooney viscosity to be reached, show tendency toward cyclisation (recognisable by an increase in Mooney viscosity). All the viscosity values obtained after a prolonged residence time of the polymer indicate an inadequate Mooney stability and a marked tendency toward cyclisation. Only those polymers with a Mooney viscosity 30 to 10 Mooney units before the minimum, show adequate Mooney stability and no tendency toward cyclisation. It is also apparent from Table I that there is no need for prolonged peptisation in the latex phase in order to adjust the required Mooney viscosity, instead the required viscosity can be adjusted by appropriately selecting the preparation conditions (during drying).

TABLE I

[Temperature of the freezing roller, −20° C.; Drying temperature, 150° C.]

| No. | Mooney viscosity after storage at 70° C. for— | Residence time (mins.) | | | | | | |
|---|---|---|---|---|---|---|---|---|
| | | 1.9 | 2.25 | 2.54 | 2.83 | 3.0 | 3.56 | 3.97 |
| 1 | 0 days | 35 | 33 | 32 | 28 | 45 | 53 | 64 |
| | 1 day | 42 | 43 | 43 | 43 | 79 | 90 | 97 |
| | 2 days | 57 | 59 | 59 | 58 | 95 | 102 | 112 |
| | 3 days | 69 | 70 | 69 | 70 | 110 | 141 | 130 |
| 2 | 0 days | | 110 | 76 | 56 | 47 | 29 | 72 |
| | 1 day | | 103 | 71 | 56 | 46 | 52 | 89 |
| | 2 days | | 77 | 60 | 48 | 50 | 54 | 115 |
| | 3 days | | 66 | 55 | 48 | 52 | 60 | 130 |
| 3 | 0 days | | 112 | 89 | 65 | 47 | 34 | 74 |
| | 1 day | | 107 | 82 | 65 | 55 | 47 | 90 |
| | 2 days | | 90 | 81 | 65 | 56 | 56 | 117 |
| | 3 days | | 77 | 63 | 65 | 58 | 60 | 135 |
| 4 | 0 days | | 110 | 99 | 77 | 82 | 95 | |
| | 1 dya | | 108 | 99 | 82 | 85 | 98 | |
| | 2 days | | 105 | 99 | 86 | 89 | 106 | |
| | 3 days | | 100 | 98 | 88 | 93 | 113 | |
| 5 | 0 days | | 108 | 77 | 55 | 46 | 36 | 85 |
| | 1 day | | 102 | 70 | 52 | 47 | 45 | 89 |
| | 2 days | | 79 | 63 | 49 | 49 | 59 | 120 |
| | 3 days | | 65 | 54 | 47 | 51 | 65 | 135 |
| 6 | 0 days | | 110 | 99 | 77 | 84 | 96 | |
| | 1 day | | 108 | 98 | 82 | 87 | 99 | |
| | 2 days | | 105 | 97 | 86 | 91 | 110 | |
| | 3 days | | 101 | 96 | 89 | 99 | 125 | |
| 7 | 0 days | | 112 | 76 | 56 | 47 | 29 | 83 |
| | 1 day | | 105 | 72 | 56 | 46 | 45 | 91 |
| | 2 days | | 77 | 63 | 56 | 45 | 55 | 120 |
| | 3 days | | 65 | 56 | 56 | 41 | 73 | 129 |
| 8 | 0 days | 76 | 52 | 46 | 40 | 43 | 58 | |
| | 1 day | 38 | 42 | 40 | 45 | 67 | 83 | |
| | 2 days | 32 | 39 | 43 | 53 | 80 | 100 | |
| | 3 days | 40 | 44 | 49 | 58 | 90 | 110 | |
| 9 | 0 days | 32 | 27 | 22 | 29 | 42 | 78 | |
| | 1 day | 29 | 28 | 28 | 54 | 74 | 100 | |
| | 2 days | 29 | 30 | 36 | 70 | 95 | 116 | |
| | 3 days | 29 | 31 | 47 | 79 | 114 | 130 | |

To determine their mechanical properties, the polymers are mixed with the following components on mixing rolls in the usual way:

100 parts by weight of polychloroprene, 29 parts by weight of semiactive furnace black, 0.5 part by weight of stearic acid, 2 parts by weight of phenyl-β-naphthylamine, 4 parts by weight of magnesium oxide and 5 parts by weight of zinc oxide.

Vulcanisation is continued for 30 minutes at 151° C. The vulcanisates produced in this way were found to have the following properties (Table II):

TABLE II

|  | Example Number | | | | |
|---|---|---|---|---|---|
|  | 1 | 2 | 3 | 8 | 9 |
| Tensile strength (kg./cm.²) | 150 | 152 | 155 | 127 | 140 |
| Breaking elongation (percent) | 750 | 780 | 750 | 640 | 690 |
| Modulus at— | | | | | |
| 300% elongation (kg./cm.²) | 40 | 41 | 40 | 41 | 40 |
| 500% elongation (kg./cm.²) | 92 | 91 | 90 | 93 | 96 |
| Shore hardness at— | | | | | |
| Room temperature | 58 | 57 | 58 | 56 | 57 |
| 75° C | 58 | 57 | 58 | 57 | 57 |
| Elasticity (percent) | 54 | 54 | 54 | 54 | 54 |

Table II shows that there are no major differences between the mechanical properties of sulphur-containing chloroprene polymers obtained by prolonged peptisation in the latex phase (Example 1) and those of similar polymers obtained by drying and degradation in a drying cabinet with a certain residence time in the drying cabinet.

What is claimed is:

1. In a process for the production of sulphur-modified chloroprene homopolymers and copolymers having a predetermined Mooney viscosity by polymerising chloroprene and up to 20% by weight, based on chloroprene, of an ethylenically unsaturated comonomer in aqueous emulsion in the presence of from 0.1 to 2% by weight, based on monomer, of sulphur and optionally in the presence of regulators, adding from 0.5 to 5% by weight, based on the polymer, of a peptising agent, coagulating the resulting latex and separating the polymer followed by drying, the improvement which comprises effecting coagulation immediately after the peptising agent has been added, and drying the polymer at a temperature from 80 to 170° C. until a Mooney viscosity of 30 to 10 Mooney units above the potential minimum is reached.

References Cited

UNITED STATES PATENTS

| 2,394,347 | 2/1946 | Wilder | 260—92.3 |
| 3,317,451 | 5/1967 | Apotheker | 260—29.7 |
| 3,378,538 | 4/1968 | Sparks | 260—92.3 |
| 3,397,173 | 8/1968 | Collette | 260—45.9 |

JOSEPH L. SCHOFER, Primary Examiner

C. A. HENDERSON, Jr., Assistant Examiner

U.S. Cl. X.R.

260—29.6, 79.5, 82.3, 82.7, 83.3, 83.5